(12) United States Patent
Song (10) Patent No.: US 11,360,842 B2
(45) Date of Patent: *Jun. 14, 2022

(54) FAULT PROCESSING METHOD, RELATED APPARATUS, AND COMPUTER (71) Applicant: Huawei Technologies Co., Ltd., Shenzhen (CN)

(72) Inventor: Gang Song, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/187,111

(22) Filed: Feb. 26, 2021

(65) Prior Publication Data
US 2021/0182136 A1 Jun. 17, 2021

Related U.S. Application Data (63) Continuation of application No. 16/509,218, filed on Jul. 11, 2019, which is a continuation of application
(Continued)

(51) Int. Cl.
G06F 11/00 (2006.01)
G06F 11/07 (2006.01)

(52) U.S. Cl.
CPC ........ *G06F 11/079* (2013.01); *G06F 11/0706* (2013.01); *G06F 11/0751* (2013.01);
(Continued)

(58) Field of Classification Search
CPC ............... G06F 11/079; G06F 11/0706; G06F 11/0751; G06F 11/0772; G06F 11/0778;
(Continued)

(56) References Cited

U.S. PATENT DOCUMENTS 8,898,517 B2 * 11/2014 Cheng ................. G06F 11/2025 714/13
2003/0070115 A1 4/2003 Nguyen et al.
(Continued)

FOREIGN PATENT DOCUMENTS

CN 1734424 A 2/2006
CN 101126995 A 2/2008
(Continued)

OTHER PUBLICATIONS

Lim, A. B., and E. D. Heaton. "Platform-level error handling strategies for intel systems." White Paper (2011). (Year: 2011).*
(Continued)

*Primary Examiner* — Anthony J Amoroso
(74) *Attorney, Agent, or Firm* — Conley Rose, P.C.

(57) ABSTRACT

In a fault processing method, when it is determined that a computer crashes, a baseboard management controller in the computer can send a read request message to a processor in the computer, where the read request message is used for requesting reading of first error data recorded by the processor, receive a read response message returned by the processor, and obtain, according to the read response message, the first error data recorded by the processor.

21 Claims, 3 Drawing Sheets

Related U.S. Application Data

No. 15/385,701, filed on Dec. 20, 2016, now Pat. No. 10,353,763, which is a continuation of application No. PCT/CN2014/080618, filed on Jun. 24, 2014.

(52) U.S. Cl.
CPC ...... *G06F 11/0772* (2013.01); *G06F 11/0778* (2013.01); *G06F 11/0793* (2013.01)

(58) Field of Classification Search
CPC ............. G06F 11/0793; G06F 11/0721; G06F 11/0724; G06F 11/0736
See application file for complete search history.

(56) References Cited

U.S. PATENT DOCUMENTS

| | | |
|---|---|---|
| 2006/0010352 A1 | 1/2006 | Mukherjee et al. |
| 2007/0061634 A1 | 3/2007 | Marisetty et al. |
| 2007/0088988 A1 | 4/2007 | Gupta et al. |
| 2007/0234123 A1 | 10/2007 | Shih et al. |
| 2008/0104453 A1 | 5/2008 | Mukherjee et al. |
| 2008/0126852 A1* | 5/2008 | Brandyberry ....... G06F 11/0745 714/6.13 |
| 2008/0270827 A1* | 10/2008 | Brandyberry ....... G06F 11/0724 714/11 |
| 2009/0089624 A1 | 4/2009 | Austen et al. |
| 2010/0313072 A1 | 12/2010 | Suffern |
| 2012/0117429 A1 | 5/2012 | Zhang |
| 2012/0131384 A1 | 5/2012 | Zou |
| 2013/0151767 A1 | 6/2013 | Berke et al. |
| 2013/0332781 A1 | 12/2013 | Jayakumar et al. |
| 2016/0266988 A1 | 9/2016 | Chen |

FOREIGN PATENT DOCUMENTS

| | | |
|---|---|---|
| CN | 100440157 A | 12/2008 |
| CN | 100440157 C | 12/2008 |
| CN | 102375775 A | 3/2012 |
| CN | 102467440 A | 5/2012 |
| CN | 103514068 A | 1/2014 |
| CN | 103647804 A | 3/2014 |
| EP | 3297309 A1 | 3/2018 |
| GB | 2431262 A | 4/2007 |
| JP | H02234241 A | 9/1990 |
| JP | H0375844 A | 3/1991 |
| JP | H05233377 A | 9/1993 |
| JP | H09288602 A | 11/1997 |
| JP | 2004320267 A | 11/2004 |
| JP | 2005251060 A | 9/2005 |
| JP | 2012003713 A | 1/2012 |
| JP | 2012079266 A | 4/2012 |
| JP | 2014048785 A | 3/2014 |

OTHER PUBLICATIONS

"HP ProLiant Gen8 Troubleshooting Guide," 2012, from: http://support.hp.com/cn-zh/document/c013444269, Dec. 2012, 4 pages with English translation.

"Dell PowerEdge R920 System Owner's Manual," Jun. 2014, 157 pages.

"IBM x86 Server Crash Judgement Process," From http://www.ibmsos.cn/a/IBMfuwuqichangjianguzhang/20110401/55.html, Apr. 1, 2011, 5 pages with English Translation.

GSMA, "RSP Architecture Version 2.2," Official Document SGP. 21-RSP Architecture, Sep. 1, 2017, 95 pages.

Intel "System Event Log Troubleshooting Guide for EPSD Platforms Based on Intel Xeon Processor E5 4600/2600/2400/1600/1400 Product Families," Revision 1.1, Sep. 2013, 141 pages.

"Intel Server Board S2600IP and Intel Workstation Board W2600CR, Technical Product Specification;" Intel order No. G34153-003, Revision 1.2, Oct. 2013, Enterprise Platforms and Services Division—Marketing, 180 pages.

\* cited by examiner

FAULT PROCESSING METHOD, RELATED APPARATUS, AND COMPUTER

CROSS-REFERENCE TO RELATED APPLICATIONS

This is a continuation of U.S. patent application Ser. No. 16/509,218, filed on Jul. 11, 2019, which is a continuation of U.S. patent application Ser. No. 15/385,701, filed on Dec. 20, 2016, now U.S. Pat. No. 10,353,763, which is a continuation of Int'l Patent App. No. PCT/CN2014/080618, filed on Jun. 24, 2014, all of which are incorporated by reference.

FIELD

Embodiments of the present disclosure relate to computer technologies, and in particular, to a fault processing method, a related apparatus, and a computer.

BACKGROUND

With the large-scale development of information technologies, computers are widely applied in various fields. Faults in a computer may generally include a software fault, a hardware fault, an operation (configuration) fault, and other faults. A hardware fault has characteristics such as difficulty in reproduction, determining mainly depending on personnel experience, difficulty in locating a fault when an error occurs, the need for multiple times of insertion and removal/replacement, and the like. Therefore, a hardware fault, for example, a fault that occurs in memory, a processor, an input/output (IO) device or the like, is usually the most difficult to process.

Generally, a hardware fault causes an uncorrectable error on a computer. An uncorrectable error not only can cause a service interruption in the computer and reduce an operation time of the computer, but also can even cause a breakdown event. In some approaches, a fault in a computer is mainly processed using the following method: When an uncorrectable error occurs in a system, a processor records error data and sends a notification to an operating system (OS). After receiving the notification, the OS captures the error data recorded by the processor and prints the error data, so that a user analyzes, locates a fault and makes a recovery from the fault.

In some approaches, an OS is needed to implement capturing of error data. However, once a severe uncorrectable error occurs in a computer and causes the computer to crash (a crash of a computer may refer to when a black screen occurs in the computer, no input is accepted using an input device such as a mouse or keyboard of the computer, and a processor of the computer cannot execute a computer instruction), the OS can no longer work and cannot capture error data in the computer, making it difficult to analyze, process a fault and make a recovery from the fault.

SUMMARY

Embodiments of the present disclosure propose a fault processing method, a related apparatus, and a computer, so that error data in a computer can be acquired after a severe uncorrectable error occurs in the computer and causes the computer to crash.

According to a first aspect, an embodiment of proposes a computer, including a processor and a baseboard management controller, where the baseboard management controller is configured to: when it is determined that the computer crashes, send a read request message to the processor, where the read request message is used for requesting reading of first error data recorded by the processor; the processor is configured to receive the read request message, and send a read response message to the baseboard management controller; and the baseboard management controller is configured to receive the read response message returned by the processor, and obtain, according to the read response message, the first error data recorded by the processor.

With reference to the first aspect, in a first possible implementation manner, the processor is further configured to acquire the first error data, and record the first error data; and that the baseboard management controller is configured to determine that the computer crashes is specifically: the baseboard management controller is configured to receive a severe fault event indication sent by the processor, where the severe fault event indication is sent by the processor when the processor acquires the first error data and the first error data is of a severe uncorrectable error type; and if at least one part of the first error data sent by the processor is not received within a preset waiting time starting from the time at which the severe fault event indication is received, the baseboard management controller is configured to determine that the computer crashes.

With reference to the first aspect or the first possible implementation manner of the first aspect, in a second possible implementation manner, that the baseboard management controller is configured to obtain, according to the read response message, the first error data recorded by the processor is specifically: when the read response message carries the first error data, the baseboard management controller is configured to obtain, from the read response message, the first error data recorded by the processor.

With reference to the first aspect or the first possible implementation manner of the first aspect, in a third possible implementation manner, that the baseboard management controller is configured to obtain, according to the read response message, the first error data recorded by the processor is specifically: when the read response message carries a read failure indication, the baseboard management controller is configured to instruct a warm reboot module or a user of the computer to perform a warm reboot on the computer, where the read failure indication is used for indicating that the first error data fails to be read from the processor, so that the processor executes, during the warm reboot of the computer, a fault collection instruction of a basic input/output system (BIOS) of the computer, acquires the first error data according to the fault collection instruction of the BIOS, and sends the first error data to the baseboard management controller; and the baseboard management controller is configured to receive the first error data sent by the processor.

With reference to the first aspect or any of the first to third possible implementation manners of the first aspect, in a fourth possible implementation manner, the baseboard management controller is further configured to parse the first error data according to a fault parsing mechanism, to obtain fault parsing information of the first error data.

With reference to the fourth possible implementation manner of the first aspect, in a fifth possible implementation manner, the baseboard management controller is further configured to analyze the fault parsing information of the first error data according to a preset fault processing mechanism, to obtain a fault processing suggestion.

With reference to the fifth possible implementation manner of the first aspect, in a sixth possible implementation manner, before it is determined that the computer crashes, the baseboard management controller is further configured to receive second error data sent by the processor, and parse the second error data according to the fault parsing mechanism, to obtain fault parsing information of the second error data, where the second error data is error data generated within a preset time before the computer generates the first error data; and that the baseboard management controller is configured to analyze the fault parsing information of the first error data according to a preset fault processing mechanism, to obtain a fault processing suggestion includes: the baseboard management controller is configured to analyze the fault parsing information of the second error data and the fault parsing information of the first error data according to the preset fault processing mechanism, to obtain the fault processing suggestion.

According to a second aspect, an embodiment proposes a fault processing method, applied to a computer including a baseboard management controller and a processor, and the method includes: when it is determined that the computer crashes, sending, by the baseboard management controller, a read request message to the processor, where the read request message is used for requesting reading of first error data recorded by the processor; and receiving, by the baseboard management controller, a read response message returned by the processor, and obtaining, according to the read response message, the first error data recorded by the processor.

With reference to the second aspect, in a first possible implementation manner, the method further includes: receiving, by the baseboard management controller, a severe fault event indication sent by the processor, where the severe fault event indication is sent by the processor when the processor acquires the first error data and the first error data is of a severe uncorrectable error type; and if at least one part of the first error data sent by the processor is not received within a preset waiting time starting from the time at which the severe fault event indication is received, determining that the computer crashes.

With reference to the second aspect or the first possible implementation manner of the second aspect, in a second possible implementation manner, the receiving, by the baseboard management controller, a read response message returned by the processor, and obtaining, according to the read response message, the first error data recorded by the processor includes: when the read response message carries the first error data, obtaining, by the baseboard management controller from the read response message, the first error data recorded by the processor.

With reference to the second aspect or the first possible implementation manner of the second aspect, in a third possible implementation manner, the receiving, by the baseboard management controller, a read response message returned by the processor, and obtaining, according to the read response message, the first error data recorded by the processor includes: when the read response message carries a read failure indication, instructing, by the baseboard management controller, a warm reboot module or a user of the computer to perform a warm reboot on the computer, so that the processor executes, during the warm reboot of the computer, a fault collection instruction of a BIOS of the computer, acquires the first error data according to the fault collection instruction of the BIOS, and sends the first error data to the baseboard management controller, where the read failure indication is used for indicating that the first error data fails to be read from the processor; and receiving, by the baseboard management controller, the first error data sent by the processor.

With reference to the second aspect or any of the first to third possible implementation manners of the second aspect, in a fourth possible implementation manner, after the obtaining, by the baseboard management controller according to the read response message, the first error data recorded by the processor, the method further includes: parsing, by the baseboard management controller, the first error data according to a fault parsing mechanism, to obtain fault parsing information of the first error data.

With reference to the fourth possible implementation manner of the second aspect, in a fifth possible implementation manner, the method further includes: analyzing, by the baseboard management controller, the fault parsing information of the first error data according to a preset fault processing mechanism, to obtain a fault processing suggestion.

With reference to the fifth possible implementation manner of the second aspect, in a sixth possible implementation manner, before the determining, by the baseboard management controller, that the computer crashes, the method further includes: receiving, by the baseboard management controller, second error data sent by the processor, where the second error data is error data generated within a preset time before the computer generates the first error data; and the analyzing, by the baseboard management controller, the fault parsing information of the first error data according to a preset fault processing mechanism, to obtain a fault processing suggestion includes: parsing, by the baseboard management controller, the second error data according to the fault parsing mechanism, to obtain fault parsing information of the second error data, and analyzing the fault parsing information of the second error data and the fault parsing information of the first error data according to the preset fault processing mechanism, to obtain the fault processing suggestion.

According to a third aspect, an embodiment proposes a baseboard management controller, including: a sending unit configured to: when it is determined that a computer crashes, send a read request message to a processor, where the read request message is used for requesting reading of first error data recorded by the processor; and a receiving unit configured to receive a read response message returned by the processor, and obtain, according to the read response message, the first error data recorded by the processor.

With reference to the third aspect, in a first possible implementation manner, the baseboard management controller further includes: a determining unit configured to receive a severe fault event indication sent by the processor, where the severe fault event indication is sent by the processor when the processor acquires the first error data and the first error data is of a severe uncorrectable error type; and if at least one part of the first error data sent by the processor is not received within a preset waiting time starting from the time at which the severe fault event indication is received, determine that the computer crashes.

With reference to the third aspect or the first possible implementation manner of the third aspect, in a second possible implementation manner, that the receiving unit receives a read response message returned by the processor, and obtaining, according to the read response message, the first error data recorded by the processor includes: when the read response message carries the first error data, the receiving unit obtains, from the read response message, the first error data recorded by the processor.

With reference to the third aspect or the first possible implementation manner of the third aspect, in a third possible implementation manner, that the receiving unit receives a read response message returned by the processor, and obtaining, according to the read response message, the first error data recorded by the processor includes: when the read response message carries a read failure indication, the receiving unit instructs a warm reboot unit or a user of the computer to perform a warm reboot on the computer, so that the processor executes, during the warm reboot of the computer, a fault collection instruction of a BIOS of the computer, acquires the first error data according to the fault collection instruction of the BIOS, and sends the first error data to the receiving unit, where the read failure indication is used for indicating that the first error data fails to be read from the processor; and the receiving unit receives the first error data sent by the processor.

With reference to the third aspect or any of the first to third possible implementation manners of the third aspect, in a fourth possible implementation manner, the baseboard management controller further includes: a fault processing unit configured to parse the first error data according to a fault parsing mechanism, to obtain fault parsing information of the first error data.

With reference to a fourth possible implementation manner of the third aspect, in a fifth possible implementation manner, the fault processing unit is further configured to analyze the fault parsing information of the first error data according to a preset fault processing mechanism, to obtain a fault processing suggestion.

With reference to the fifth possible implementation manner of the third aspect, in a sixth possible implementation manner, the receiving unit is further configured to receive second error data sent by the processor; the fault processing unit is further configured to parse the second error data according to the fault parsing mechanism, to obtain fault parsing information of the second error data, where the second error data is error data generated within a preset time before the computer generates the first error data; and that the fault processing unit is configured to analyze the fault parsing information of the first error data according to a preset fault processing mechanism, to obtain a fault processing suggestion includes: the fault processing unit analyzes the fault parsing information of the second error data and the fault parsing information of the first error data according to the preset fault processing mechanism, to obtain the fault processing suggestion.

According to a fourth aspect, an embodiment proposes a baseboard management controller, where the baseboard management controller includes a processor, a memory, a bus, and a communications interface, where the memory is configured to store a computer executable instruction, the processor is connected to the memory using the bus, and when the baseboard management controller runs, the processor executes the computer executable instruction stored in the memory, so that the baseboard management controller performs the fault processing method according to the second aspect, or the fault processing method according to any one of the possible implementation manners of the second aspect.

According to a fifth aspect, an embodiment proposes a computer readable medium, including a computer executable instruction, so that when a processor of a computer executes the computer executable instruction, the computer performs the fault processing method according to the second aspect, or the fault processing method according to any one of the possible implementation manners of the second aspect.

In the embodiments, when it is determined that a computer crashes, a baseboard management controller in the computer may send a read request message to a processor in the computer, where the read request message is used for requesting reading of first error data recorded by the processor, receive a read response message returned by the processor, and obtain, according to the read response message, the first error data recorded by the processor. By means of the foregoing manner, an operating system does not need to be used, only a baseboard management controller is needed to implement acquisition of error data in a computer after the computer crashes, and a problem that error data in a computer cannot be acquired after a severe uncorrectable error occurring in the computer causes a system crash is resolved.

BRIEF DESCRIPTION OF THE DRAWINGS

To describe the technical solutions in the embodiments more clearly, the following briefly introduces the accompanying drawings required for describing the embodiments. The accompanying drawings in the following description show merely some embodiments, and a person of ordinary skill in the art may still derive other drawings from these accompanying drawings without creative efforts.

DETAILED DESCRIPTION

Embodiments propose a fault processing method, a related apparatus, and a computer, so that error data in a computer can be acquired after a severe uncorrectable error occurs in the computer and causes a crash of the computer.

It should be noted that, in the specification, claims, and accompanying drawings, the terms "first" and "second" are intended to distinguish between similar objects but do not necessarily indicate a specific order or sequence. It should be understood that the numbers used in this way are interchangeable in appropriate cases. In the specification, claims, and accompanying drawings, a crash of a computer refers to a black screen occurring in the computer, a processor of the computer cannot execute a computer instruction, and no input is accepted using an input device such as a mouse or keyboard of the computer.

Embodiment 1

Figure 1:
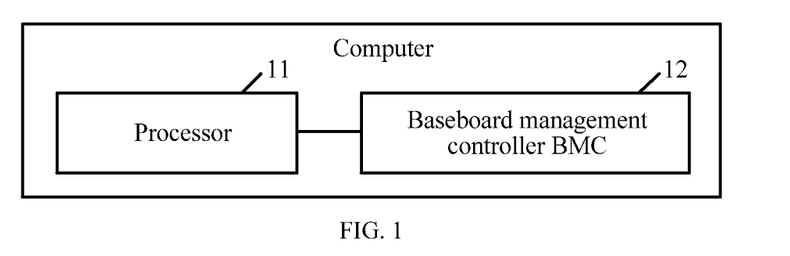
FIG. 1 is a schematic diagram of a computer according to an embodiment.

FIG. 1 is a schematic diagram of a computer according to this embodiment. The computer includes a processor 11 and a baseboard management controller 12.

The baseboard management controller 12 is configured to: when it is determined that the computer crashes, send a read request message to the processor 11, where the read request message is used for requesting reading of first error data recorded by the processor 11, where the first error data is error data generated in the computer, and may be all the error data generated in the computer, or may further be a part of the error data generated in the computer. For example, the first error data may be error data generated within 2 seconds before the computer crashes, which is not limited herein in this embodiment.

The processor 11 is configured to receive the read request message, and send a read response message to the baseboard management controller 12. At this time, although the computer has crashed and the processor cannot execute any computer instruction, the processor may receive and respond to the read request message.

The baseboard management controller 12 is configured to receive the read response message returned by the processor 11, and obtain, according to the read response message, the first error data recorded by the processor 11.

For example, the processor 11 may record the first error data in a register of the processor 11. The baseboard management controller 12 may send a read request message to the processor 11 using an address of the register, to acquire the first error data from the register. Although the computer has crashed and cannot execute a computer instruction, the register of the processor 11 may respond to the read request message and return a read response message, for example, return the first error data, so that the baseboard management controller 12 may obtain the first error data according to the read response message. It should be noted that, in this embodiment, the first error data may include one or more pieces of error data, which is not limited herein in this embodiment.

In this embodiment, when it is determined that the computer crashes, a baseboard management controller 12 may send a read request message to a processor 11, where the read request message is used for requesting reading of first error data recorded by the processor 11, receive a read response message returned by the processor 11, and obtain the first error data according to the read response message recorded by the processor 11. In this embodiment, an operating system does not need to be used, only a baseboard management controller is needed to implement acquisition of error data in a computer after the computer crashes, and a problem that error data in a computer cannot be acquired after a severe uncorrectable error occurring in the computer causes a system crash is resolved.

This embodiment is introduced below in detail.

(1) About how to Determine a Crash of a Computer

Generally, an uncorrectable error caused by a fault in a computer may be categorized into a catastrophic error, a fatal error, and a recoverable error. The catastrophic error and the fatal error are the severest, and may cause a blue screen, a purple screen or even a crash (for example, a black screen and a suspension) to occur in the computer. Therefore, a catastrophic error or a fatal error in the computer may be monitored. For example, an internal error (IERR), which belongs to a catastrophic error, or a machine check error (MCERR), which belongs to a fatal error, is monitored. When a catastrophic error or a fatal error occurs in the computer, if the computer cannot execute an instruction of a BIOS or an instruction of an OS, it may be determined that the computer crashes.

Specifically, the processor 11 may be further configured to acquire the first error data, and record the first error data. For example, the processor 11 may generate or receive the first error data, and record the first error data in a cache of the computer or the register of the processor 11 or another module having a storage capability. In one aspect, after the processor 11 acquires the first error data, if the computer does not crash, the processor 11 may send the first error data to the baseboard management controller to, for example, configure an error collection instruction of the BIOS in the computer in advance. If the computer does not crash, the processor 11 executes the error collection instruction of the BIOS, and sends the first error data to the baseboard management controller 12 according to the error collection instruction of the BIOS. If the computer crashes, the processor 11 cannot execute any computer instruction. In another aspect, after the processor 11 acquires the first error data, if the first error data is of a severe uncorrectable error type, the processor 11 may further send a severe fault event indication, to notify the baseboard management controller 12 of that a catastrophic error or a fatal error occurs in the computer and may cause a crash. That the first error data is of the severe uncorrectable error type refers to that the first error data belongs to a catastrophic error or a fatal error. Therefore, the baseboard management controller 12 may be configured to receive the severe fault event indication sent by the processor 11. If at least one part of the first error data sent by the processor 11 is not received within a preset waiting time starting from the time at which the severe fault event indication is received, the baseboard management controller 12 may determine that the computer crashes.

In addition, the baseboard management controller 12 may further determine, according to a notification from a user, that the computer crashes. For example, when finding that the computer crashes, the user may notify the baseboard management controller 12, and the baseboard management controller 12 may determine, according to the notification from the user, that the computer crashes, so as to start acquisition of the first error data.

(2) About Acquisition of First Error Data

When receiving the read request message, the processor 11 may add the first error data to the read response message according to the read request message and return the read response message to the baseboard management controller 12. At this time, the baseboard management controller 12 reads data successfully, and the baseboard management controller 12 may obtain, from the read response message, the first error data recorded by the processor 11.

However, when some hardware faults cause an uncorrectable error and further result in a crash of the computer, the baseboard management controller 12 may fail to read the first error data, and the read response message carries a read failure indication, where the read failure indication is used for indicating that the first error data fails to be read from the processor 11. The baseboard management controller 12 may be configured to instruct a warm reboot module or a user of the computer to perform a warm reboot on the computer, so that the processor 11 executes, during the warm reboot of the computer, a fault collection instruction of a BIOS of the computer, acquires the first error data according to the fault collection instruction of the BIOS, and sends the first error data to the baseboard management controller 12. The baseboard management controller 12 may receive the first error data sent by the processor 11, to complete acquisition of the first error data.

It should be noted that, a reboot of a computer may be categorized into a warm reboot and a cold reboot. During a cold reboot, the computer is powered off, the computer is initialized, and after the cold reboot, a loss of information may be caused. For example, after a cold reboot, information saved in a register of a processor is lost. A cold reboot is performed on the computer when a reboot power switch is pressed. Different from a cold reboot, during a warm reboot, the computer is not powered off, the computer is not initialized, and information saved in the register of the processor is not lost. A warm reboot refers to clicking "restart" at the start menu to shut down and start the computer according to a normal procedure. In this embodiment and subsequent embodiments, a warm reboot performed on the computer has the same meaning as above.

In addition, the baseboard management controller 12 may be further configured to: after the first error data is acquired, send a clear data message to the processor 11, to instruct the processor to 11 to delete the first error data recorded by the processor 11, thereby avoiding a waste of a storage resource.

Optionally, the baseboard management controller 12 may be further configured to: after the severe fault event indication sent by the processor 11 is received, send an alarm message to a fault alarm module of the computer or perform a printing operation, so as to notify the user of the severe fault event to enable the user to acquire a fault in the computer in time.

(3) About Analysis, Location, and Processing of a Fault

In some approaches, generally, only error data in a case in which a computer does not crash can be printed, so there is no complete fault record, and a fault can be analyzed, located, and processed only in a manual manner. In this embodiment, the baseboard management controller 12 may record a complete fault record, and further automatically locate a fault source and provide a fault processing suggestion, which provides help in processing a fault and making a recovery from the fault in time. A specific solution is as follows:

First error data recorded by the processor 11 is generally information represented by "0" or "1". Therefore, the baseboard management controller 12 may be further configured to parse the first error data according to a fault parsing mechanism, to obtain fault parsing information of the first error data. The fault parsing information of the first error data may include: the time at which each piece of error data in the first error data is generated, who collects the error data, which processor the error data comes from, which core, what error the error data belongs, and the like. For example, in a case of a computer of X86, the baseboard management controller 12 may parse, according to fault code definitions from Intel, the first error data in a binary form, to obtain the fault parsing information. The fault parsing information not only may be provided to a maintenance personnel or a user to understand a case of a fault, but also may be further used for subsequent location, analysis, and processing of the fault.

The baseboard management controller 12 may be further configured to analyze the fault parsing information of the first error data according to a preset fault processing mechanism, to obtain a fault processing suggestion. The preset fault processing mechanism may be a fault mechanism or fault processing experience for X86, and the obtained fault processing suggestion may include fault location information and/or processing suggestion information, so that the user or a fault rectification personnel may perform processing on the computer according to the fault processing suggestion to recover the computer. Furthermore, the first error data may be only error data generated within a very short period of time before the computer crashes. For example, the first error data is error data generated within 0.5 second before the computer crashes, and therefore, to improve the accuracy of locating and analyzing a fault, fault parsing information of more error data may be analyzed.

Specifically, before it is determined that the computer crashes, the baseboard management controller 12 may further receive second error data sent by the processor 11, where the second error data is different from the first error data, and the second error data is error data generated within a preset time before the computer generates the first error data. The baseboard management controller 12 may parse the second error data according to the fault parsing mechanism, to obtain fault parsing information of the second error data, and analyze the fault parsing information of the second error data and the fault parsing information of the first error data according to the preset fault processing mechanism, to obtain the fault processing suggestion. For example, the first error data may be error data generated within 0.5 second before the computer crashes, and when the preset time is 4.5 seconds, the second error data may be error data generated within 5 seconds before the computer crashes minus the 0.5 second before the computer crashes; in this case, the baseboard management controller 12 may analyze, according to the preset fault processing mechanism, the fault parsing information of error data within 5 seconds before the computer crashes, to obtain the fault processing suggestion.

Furthermore, the baseboard management controller 12 may be further configured to print the fault parsing information of the first error data or the fault parsing information of the first error data or the fault processing suggestion, so that the user or the fault rectification personnel may process the fault in the computer according to the printed information.

Furthermore, the baseboard management controller 12 may further save at least one of the fault parsing information of the first error data, the fault parsing information of the second error data, the first error data, and the second error data in a fault information base of the computer, to obtain a fault record of the computer, so as to provide help in subsequently locating the fault and making a recovery from the fault. For example, the baseboard management controller 12 may save the fault parsing information of the first error data and the fault parsing information of the second error data in the fault information base, so that the fault information base saves complete error data, and may provide a complete fault record. In this embodiment, the fault information base may be set in the baseboard management controller 12, or may also be set outside the baseboard management controller 12.

It should be noted that in a process of practical application, different manners may be used according to different application scenarios to locate, analyze, and process a fault in a computer. For example, for a non-single-node application scenario, a system may include multiple computers according to this embodiment Each computer according to this embodiment may have capabilities of locating, analyzing, and processing a fault. At this time, a baseboard management controller of one computer (for example, a primary computer) of the multiple computers may collect error data from baseboard management controllers of other computers, and the baseboard management controller of the one computer performs joint fault location, analysis, and processing on all computers in the system. Alternatively, baseboard management controllers of the multiple computers in the system may report error data obtained by the baseboard management controllers to a management device (for example, a management server) in the system, and the management device performs joint fault location, analysis, and processing on all computers in the system using the manner in this method embodiment.

In this embodiment, an operating system does not need to be used, only a baseboard management controller 12 is needed to implement acquisition of error data in a computer after the computer crashes, and a problem that error data in a computer cannot be acquired after a severe uncorrectable error occurring in the computer causes a system crash is resolved. In addition, the baseboard management controller 12 may further record a complete fault in the fault record base, and may further parse the first error data, analyze the fault parsing information of the first error data according to a preset fault processing mechanism, locate a fault source, and provide a processing suggestion.

Embodiment 2

Various specific details are provided in specific implementation manners below. A person skilled in the art should understand that the present disclosure can also be implemented without some specific details. In this embodiment, the structural composition and functions of the processor 11 and the baseboard management controller 12 in Embodiment 1 are introduced in detail with reference to FIG. 2.

Figure 2:
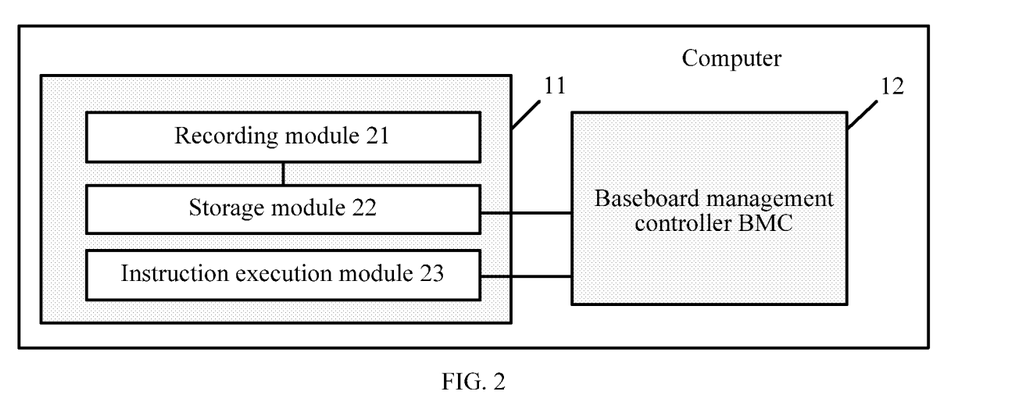
FIG. 2 is a schematic diagram of another computer according to an embodiment.

FIG. 2 is a schematic structural diagram of the composition of a computer according to this embodiment. The computer includes a processor 11 and a baseboard management controller 12. The processor 11 may include a recording module 21, a storage module 22, and an instruction execution module 23. The recording module 21 may be specifically a hardware Machine Check Architecture (MCA) responsible for internal functional modules of the processor 11, and/or an Advanced Error Reporting (AER) responsible for a Peripheral Component Interconnect Express (PCIe) standard of an input output device of the computer. Correspondingly, the storage module 22 may be a register of the MCA and/or a register of the AER. The register of the MCA and the register of the AER may be located inside the processor 11. The instruction execution module 23 may be a core of the processor 11 and is configured to execute an instruction of a BIOS and an instruction of an operating system.

The recording module 21 may be configured to acquire error data in the computer, for example, produce error data generated as a fault occurs in internal functional modules of the processor 11, or for another example, receive error data generated as a fault occurs in the IO device. The error data in the computer includes, but is not limited to, the first error data and the second error data in this embodiment. The recording module 21 may record, in the storage module 22, the acquired error data in the computer. Specifically, if error data in the computer is acquired by the MCA, the MCA may record, in the register of the MCA, the error data in the computer. If error data in the computer is acquired by the AER, the AER may record, in the register of the AER, the error data in the computer, where a range of the error data acquired by the MCA or the AER may be implemented by configuring the corresponding register using the BIOS. Optionally, when/after recording, in the corresponding register, the error data in the computer, the MCA or the AER may further save, in a first register, an address of a register that records the error data in the computer, so that subsequently the instruction execution module 23 may acquire the error data in the computer according to an error collection instruction of the BIOS and using the address recorded in the first register.

When acquiring the error data in the computer, the recording module 21 may further trigger a system management interrupt (SMI). The system management interrupt is configured to trigger the instruction execution module 23 to execute the error collection instruction of the BIOS. If the computer does not crash, the instruction execution module 23 may acquire, from the storage module 22, error data in the computer according to the error collection instruction of the BIOS, and send the error data to the baseboard management controller 12. If the computer crashes, the instruction execution module 23 cannot execute any computer instruction, where the error collection instruction of the BIOS may be configured in advance in a memory that stores the instruction of the BIOS.

In practice, it may be known according to Embodiment 1 that the second error data is error data generated within a preset time before the computer generates the first error data, and therefore, the recording module 21 first acquires the second error data and then acquires the first error data. Therefore, when acquiring the second error data, in one aspect, the recording module 21 may record the second error data in the storage module 22, and in another aspect, may trigger the system management interrupt. If the computer does not crash, the instruction execution module 23 may execute the error collection instruction of the BIOS according to the system management interrupt, and acquire the second error data from the storage module 22 according to the error collection instruction of the BIOS and send the second error data to the baseboard management controller 12. Optionally, the instruction execution module 23 may send the second error data to the baseboard management controller 12 using an Intelligent Platform Management Interface (IPMI) standard, and the baseboard management controller 12 may receive, using the IPMI standard, the second error data sent by the instruction execution module 23. It should be noted that, when the second error data includes multiple pieces of error data and the recording module 21 can only acquire the second error data after multiple times, the recording module 21 may trigger the system management interrupt each time when the recording module 21 acquires a part of the second error data. Correspondingly, the instruction execution module 23 may execute the error collection instruction of the BIOS multiple times to perform sending multiple times to send the second error data to the baseboard management controller 12. Optionally, after sending the second error data to the baseboard management controller 12, the instruction execution module 23 may execute a delete instruction of the operating system to delete, according to the delete instruction of the operating system, the second error data saved in the recording module 21. In other words, the instruction execution module 23 may delete, from the storage module 22, the error data that has been sent to the baseboard management controller 12, thereby avoiding repeated sending of error data to the baseboard management controller 12.

If the recording module 21 acquires the first error data after acquiring the second error data, the recording module 21 may also trigger the system management interrupt. Furthermore, if the first error data is of a severe uncorrectable error type, that is, the first error data belongs to a catastrophic error or a fatal error, the recording module 21 may further trigger a severe fault event indication to notify the baseboard management controller 12 that a catastrophic error or a fatal error occurs in the computer and may cause a crash. When the first error data is really of the severe uncorrectable error type and the computer does crash, the instruction execution module 23 cannot execute a computer instruction, and even though the recording module 21 has triggered the system management interrupt, the instruction execution module 23 still cannot execute the error collection instruction of the BIOS and cannot acquire the first error data from the storage module 22 for the baseboard management controller 12. Therefore, if the baseboard management controller 12 does not receive at least one part of the first error data sent by the processor 11 within a preset waiting time starting from the time at which the severe fault event indication is received, it may be determined that the computer crashes. Specifically, triggering of the severe fault event indication by the recording module 21 may be implemented by changing a level of a pin CATERR_N or ERROR_N, and the baseboard management controller 12 may receive the severe fault event indication by receiving a level signal from the pin CATERR_N or ERROR_N.

When it is determined that the computer crashes, the baseboard management controller 12 may send a read request message to the recording module 21, where the read request message is used for requesting reading of the first error data. After the computer crashes, the recording module 21 may still receive the read request message, and send a read response message to the baseboard management controller 12. Therefore, the baseboard management controller 12 may receive the read response message, and obtain the first error data according to the read response message recorded by the processor 11. Specifically, the baseboard management controller 12 may traverse the register of the MCA or the register of the AER using a Platform Environment Control Interface (PECI) bus, so as to read the first error data from the register of the MAC or the register of the AER. If the baseboard management controller 12 reads data successfully from the register of the MAC or the register of the AER, a read response message returned by the register of the MAC or the register of the AER carries the first error data, and the baseboard management controller 12 may acquire the first error data. If the baseboard management controller 12 fails to read data from the register of the MAC or the register of the AER, a read response message returned by the register of the MAC or the register of the AER carries a read failure indication, for example, garbled characters. Therefore, the baseboard management controller 12 may instruct a warm reboot module or a user of the computer to perform a warm reboot on the computer, so that the instruction execution module 23 executes, during the warm reboot of the computer, a fault collection instruction of the BIOS, traverses the register of the MAC or the register of the AER according to the fault collection instruction of the BIOS, acquires the first error data, and sends the first error data to the baseboard management controller 12 using the IPMI standard, and the baseboard management controller 12 may receive the first error data sent by instruction execution module 23.

In this embodiment, the baseboard management controller 12 cooperates with the processor 11 to implement acquisition of error data in a computer after the computer crashes, and a problem that error data in a computer cannot be acquired after a severe uncorrectable error occurring in the computer causes a system crash is resolved.

Embodiment 3

Figure 3:
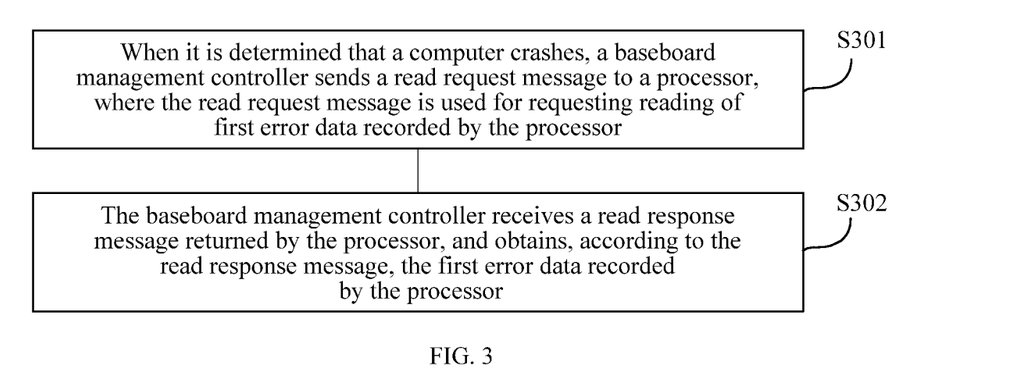
FIG. 3 is a method flowchart of a fault processing method according to an embodiment.

This embodiment provides a fault processing method, used in the computer shown in FIG. 1 or FIG. 2, the computer including a baseboard management controller and a processor, where the method includes:

S301: When it is determined that the computer crashes, a baseboard management controller sends a read request message to a processor, where the read request message is used for requesting reading of first error data recorded by the processor.

The processor may acquire the first error data, and record the first error data. When it is determined that the computer crashes, the baseboard management controller may send a read request message to the processor, to read the first error data recorded by the processor. At this time, although the computer has crashed and the processor cannot execute any computer instruction, the processor may receive and respond to the read request message, so that the baseboard management controller may acquire the first error data. For example, the processor may record the first error data in a register of the processor, and the baseboard management controller may send the read request message to the register of the processor. The register of the processor may receive the read request message, and return a read response message. In this embodiment, the first error data may include one or more pieces of error data, which is not limited herein in this embodiment.

The baseboard management controller determines that the computer crashes in multiple manners, and specifically, reference may be made to Embodiment 1 or Embodiment 2, and details are not described herein again in this embodiment.

S302: The baseboard management controller receives a read response message returned by the processor, and obtains, according to the read response message, the first error data recorded by the processor.

If the baseboard management controller reads data successfully from the processor, the read response message may carry the first error data, and the baseboard management controller may obtain, from the read response message, the first error data recorded by the processor. If the baseboard management controller fails to read data from the processor, the read response message may carry a read failure indication, and the baseboard management controller may acquire the first error data in another manner. For example, a fault collection instruction of the BIOS may be configured in advance in the computer. When the read response message carries the read failure indication, the baseboard management controller may instruct a warm reboot module or a user of the computer to perform a warm reboot on the computer, so that the processor executes, during the warm reboot of the computer, the fault in the computer collection instruction of the BIOS, acquires the first error data according to the fault collection instruction of the BIOS, and sends the first error data to the baseboard management controller, and the baseboard management controller may complete acquisition of the first error data by receiving the first error data sent by the processor.

In this embodiment, when it is determined that the computer crashes, a baseboard management controller of a computer may send a read request message to a processor of the computer, where the read request message is used for requesting reading of first error data recorded by the processor, receive a read response message returned by the processor, and obtain, according to the read response message, the first error data recorded by the processor. By means of this embodiment, an operating system does not need to be used, only a baseboard management controller is needed to implement acquisition of error data in a computer after the computer crashes, and a problem that error data in a computer cannot be acquired after a severe uncorrectable error occurring in the computer causes a system crash is resolved.

Embodiment 4

Figure 4:
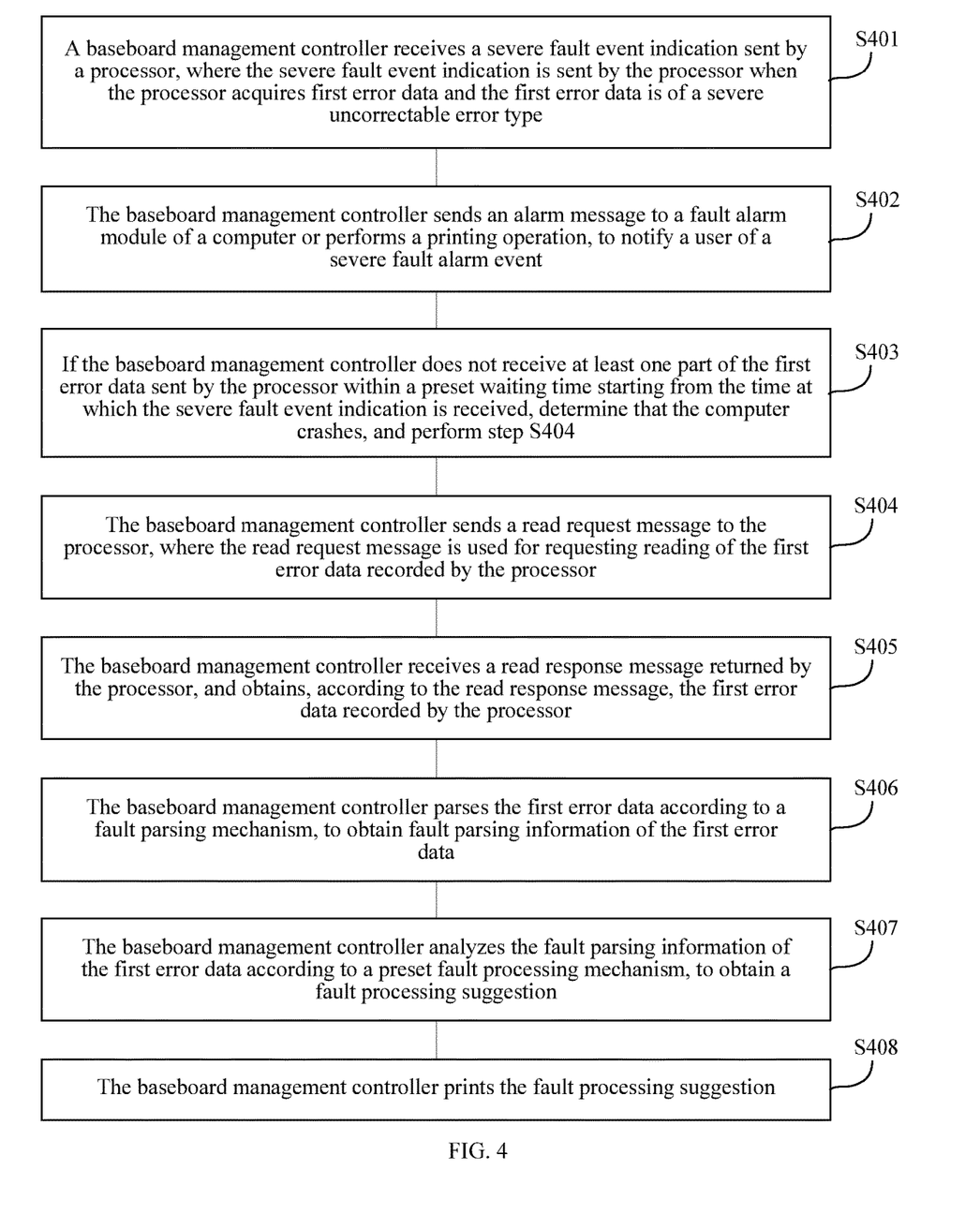
FIG. 4 is a method flowchart of another fault processing method according to an embodiment.

This embodiment provides a fault processing method, used in the computer shown in FIG. 1 or FIG. 2, the computer including a baseboard management controller and a processor, where the method includes:

S401: A baseboard management controller receives a severe fault event indication sent by a processor, where the severe fault event indication is sent by the processor when the processor acquires first error data and the first error data is of a severe uncorrectable error type.

S402: The baseboard management controller sends an alarm message to a fault alarm module of the computer or performs a printing operation, to notify a user of the severe fault event.

After receiving the severe fault event indication sent by the processor, the baseboard management controller may trigger a fault alarm sensor using the alarm message or perform the printing operation to notify the user that a severe fault occurs in the computer and may cause a crash. In this embodiment, S402 is an optional step.

S403: If the baseboard management controller does not receive at least one part of the first error data sent by the processor within a preset waiting time starting from the time at which the severe fault event indication is received, determine that the computer crashes, and perform step S404.

After the processor acquires the first error data, if the computer does not crash, the processor may execute an error collection instruction of a BIOS, and send the first error data to the baseboard management controller according to the error collection instruction of the BIOS. If the computer crashes, the processor cannot execute any computer instruction. Therefore, if the baseboard management controller does not receive at least one part of the first error data sent by the processor within the preset waiting time starting from the time at which the severe fault event indication is received, it may be determined that the computer crashes.

S404: The baseboard management controller sends a read request message to the processor, where the read request message is used for requesting reading of the first error data recorded by the processor.

After it is determined that the computer crashes, the baseboard management controller may acquire the first error data from the processor, to implement acquisition of error data in the computer after the computer crashes.

S405: The baseboard management controller receives a read response message returned by the processor, and obtains, according to the read response message, the first error data recorded by the processor.

The baseboard management controller obtains, according to the read response message, the first error data recorded by the processor, and specifically, the manner in S405a may be used, or the manner in S405b may be used.

S405a: If the read response message carries the first error data, the baseboard management controller obtains, from the read response message, the first error data recorded by the processor.

If the read response message carries the first error data, it indicates that the baseboard management controller reads the first error data successfully from the processor, and the baseboard management controller may obtain, from the read response message, the first error data recorded by the processor.

S405b: If the read response message carries a read failure indication, where the read failure indication is used for indicating that the first error data fails to be read from the processor, the baseboard management controller instructs a warm reboot module or the user of the computer to perform a warm reboot on the computer, so that the processor executes, during the warm reboot of the computer, a fault collection instruction of a BIOS of the computer, acquires the first error data according to the fault collection instruction of the BIOS, and sends the first error data to the baseboard management controller; and the baseboard management controller receives the first error data sent by the processor.

The fault collection instruction of the BIOS may be configured in advance in the computer. When the baseboard management controller fails to read the first error data from the processor, the read response message carries the read failure indication, and the baseboard management controller instructs the warm reboot module or the user of the computer to perform a warm reboot on the computer, so that the processor executes, during the warm reboot of the computer, the fault collection instruction of the BIOS of the computer, acquires the first error data according to the fault collection instruction of the BIOS, and sends to the baseboard management controller.

S406: The baseboard management controller parses the first error data according to a fault parsing mechanism, to obtain fault parsing information of the first error data.

After acquiring the first error data, the baseboard management controller parses the first error data according to the fault parsing mechanism, to obtain the fault parsing information of the first error data, where the fault parsing information of the first error data may include: the time at which each piece of error data in the first error data is generated, who collects the error data, which processor the error data comes from, which core, what error the error data belongs, and the like. The fault parsing information not only may be provided to a maintenance personnel or the user to understand a case of a fault, but also may be further used for subsequent location, analysis, and processing of the fault.

S407: The baseboard management controller analyzes the fault parsing information of the first error data according to a preset fault processing mechanism, to obtain a fault processing suggestion.

The preset fault processing mechanism may be a fault mechanism or fault processing experience for X86. The baseboard management controller analyzes the fault parsing information of the first error data according to the preset fault processing mechanism, and obtains the fault processing suggestion, where the fault processing suggestion may be fault location information or processing suggestion information, so that the user or fault rectification personnel may perform processing on the computer according to the fault processing suggestion, to recover the computer.

S408: The baseboard management controller prints the fault processing suggestion.

After obtaining the fault processing suggestion, the baseboard management controller may print the fault processing suggestion, or may further print the fault processing suggestion and the fault parsing information of the first error data, so that the user or fault rectification personnel may perform processing on the computer according to the printed information, to recover the computer.

In this embodiment, an operating system does not need to be used, only a baseboard management controller is needed to implement acquisition of error data in a computer after the computer crashes, and a problem that error data in a computer cannot be acquired after a severe uncorrectable error occurring in the computer causes a system crash is resolved. In addition, the baseboard management controller may further parse the first error data, and analyze the fault parsing information of the first error data according to a preset fault processing mechanism, to locate a fault source and provide a processing suggestion.

Because in step S407, the fault parsing information of only the first error data is analyzed to obtain the fault processing suggestion, the first error data may be only error data generated within a very short period of time before the computer crashes. For example, the first error data is error data generated within 2 seconds before the computer crashes, and therefore, to improve the accuracy of locating and analyzing a fault, fault parsing information of more error data may be analyzed.

Before step S403, the baseboard management controller may further receive second error data sent by the processor, where the second error data is error data generated within a preset time before the computer generates the first error data.

Step S407 may further be: The baseboard management controller parses the second error data according to the fault parsing mechanism, to obtain fault parsing information of the second error data, and analyzes the fault parsing information of the second error data and the fault parsing information of the first error data, to obtain the fault processing suggestion.

In this embodiment, the baseboard management controller may analyze the fault parsing information of the second error data and the fault parsing information of the first error data, to obtain the fault processing suggestion, so as to improve the accuracy of locating and analyzing a fault.

Optionally, after step S405, the baseboard management controller may further save at least one of the fault parsing information of the first error data, the fault parsing information of the second error data, the first error data, and the second error data in a fault information base of the computer. For example, the fault parsing information of the first error data and the fault parsing information of the second error data are saved in the fault information base, or the first error data and the second error data are saved in the fault information base, so as to record a complete fault record in the fault record base.

Optionally, after step S405, the baseboard management controller may further send a clear data message to the processor, to instruct the processor to delete the first error data recorded by the processor, thereby avoiding a waste of a storage resource.

For the baseboard management controller in Embodiment 3 or Embodiment 4, specifically, reference may be made to the interaction and fault processing of the baseboard management controller in Embodiment 1 or Embodiment 2 and a processor.

Embodiment 5

Figure 5:
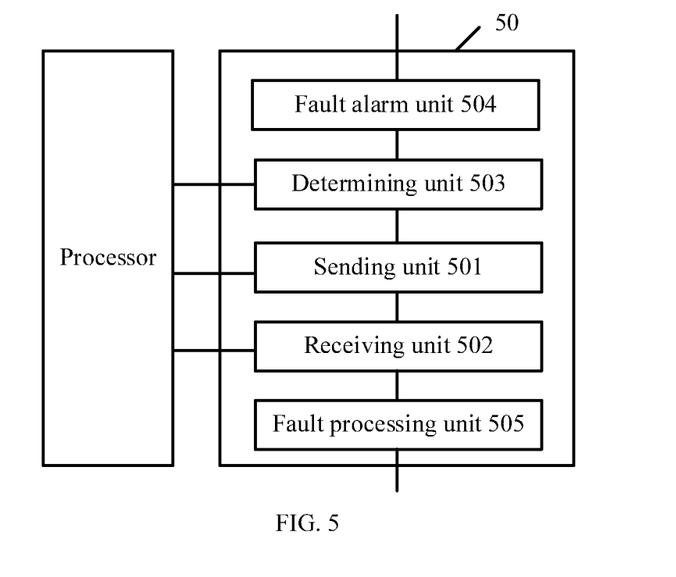
FIG. 5 is a schematic diagram of a baseboard management controller according to an embodiment.

This embodiment provides a baseboard management controller, used in a computer including the baseboard management controller and a processor, for example, used in the computer shown in FIG. 1 or 2. As shown in FIG. 5, the baseboard management controller may include a sending unit and a receiving unit.

The sending unit is configured to: when it is determined that the computer crashes, send a read request message to the processor, where the read request message is used for requesting reading of first error data recorded by the processor. Although the computer has crashed and the processor cannot execute any computer instruction, the processor may receive and respond to the read request message.

The receiving unit is configured to receive a read response message returned by the processor, and obtain, according to the read response message, the first error data recorded by the processor. For example, when the read response message carries the first error data, the receiving unit may obtain, from the read response message, the first error data recorded by the processor. For another example, when the read response message carries a read failure indication, the receiving unit may instruct a warm reboot unit or a user of the computer to perform a warm reboot on the computer, so that the processor executes, during the warm reboot of the computer, a fault collection instruction of a BIOS of the computer, acquires the first error data according to the fault collection instruction of the BIOS, and sends the first error data to the receiving unit, where the read failure indication is used for indicating that the first error data fails to be read from the processor; and the receiving unit receives the first error data sent by the processor. Optionally, after the first error data is acquired, the receiving unit may further send a clear data message to the processor, to instruct the processor to delete the first error data recorded by the processor, thereby avoiding a waste of a storage resource.

Optionally, the baseboard management controller may further include a determining unit configured to receive a severe fault event indication sent by the processor, where the severe fault event indication is sent by the processor when the processor acquires the first error data and the first error data is of a severe uncorrectable error type; and if at least one part of the first error data sent by the processor is not received within a preset waiting time starting from the time at which the severe fault event indication is received, determine that the computer crashes.

Optionally, the baseboard management controller may further include a fault alarm unit configured to: after the determining unit receives the severe fault event indication sent by the processor, send an alarm message to the fault alarm unit of the computer or perform a printing operation, to notify the user of the severe fault event.

Optionally, the baseboard management controller may further include a fault processing unit configured to parse the first error data according to a fault parsing mechanism, to obtain fault parsing information of the first error data. The fault parsing information of the first error data may include: the time at which each piece of error data in the first error data is generated, who collects the error data, which processor the error data comes from, which core, what error the error data belongs, and the like. The fault parsing information not only may be provided to a maintenance personnel or the user to understand a case of a fault, but also may be further used for subsequent location, analysis, and processing of the fault.

In addition, the fault processing unit may be further configured to analyze the fault parsing information of the first error data according to a preset fault processing mechanism, to obtain a fault processing suggestion. The preset fault processing mechanism may be a fault mechanism or fault processing experience for X86. The fault processing suggestion may be fault location information or processing suggestion information, so that the user or fault rectification personnel may perform processing on the computer according to the fault processing suggestion, to recover the computer.

Because the fault processing unit analyzes the fault parsing information of only the first error data to obtain the fault processing suggestion, the first error data may be only error data generated within a very short period of time before the computer crashes. For example, the first error data is error data generated within 0.8 second before the computer crashes, and therefore, to improve the accuracy of locating and analyzing a fault, the fault processing unit may analyze fault parsing information of more error data. Specifically, the receiving unit is further configured to receive second error data sent by the processor, where the second error data is error data generated within a preset time before the computer generates the first error data, and may parse the second error data according to the fault parsing mechanism, to obtain fault parsing information of the second error data, and analyze the fault parsing information of the second error data and the fault parsing information of the first error data according to the preset fault processing mechanism, to obtain the fault processing suggestion.

Optionally, the fault processing unit is further configured to print the fault parsing information of the first error data or the fault processing suggestion.

Optionally, the fault processing unit is further configured to save at least one of the fault parsing information of the first error data, the fault parsing information of the second error data, the first error data, and the second error data in a fault information base of the computer. For example, the fault parsing information of the first error data and the fault parsing information of the second error data are saved in the fault information base, or the first error data and the second error data are saved in the fault information base, so as to record a complete fault record in the fault record base.

For the baseboard management controller in this embodiment, specifically, reference may be made to the interaction and fault processing of the baseboard management controller in Embodiment 1 or Embodiment 2 and a processor.

In this embodiment, when it is determined that the computer crashes, the sending unit may send a read request message to a processor of the computer, where the read request message is used for requesting reading of first error data recorded by the processor, and the receiving unit may receive a read response message returned by the processor, and obtain, according to the read response message, the first error data recorded by the processor. By means of this embodiment, an operating system does not need to be used, only a baseboard management controller is needed to implement acquisition of error data in a computer after the computer crashes, and a problem that error data in a computer cannot be acquired after a severe uncorrectable error occurring in the computer causes a system crash is resolved.

An embodiment provides a computer readable medium, including a computer executable instruction, so that when a processor of a computer executes the computer executable instruction, the computer may execute the fault processing method in Embodiment 3 or Embodiment 4.

Figure 6:
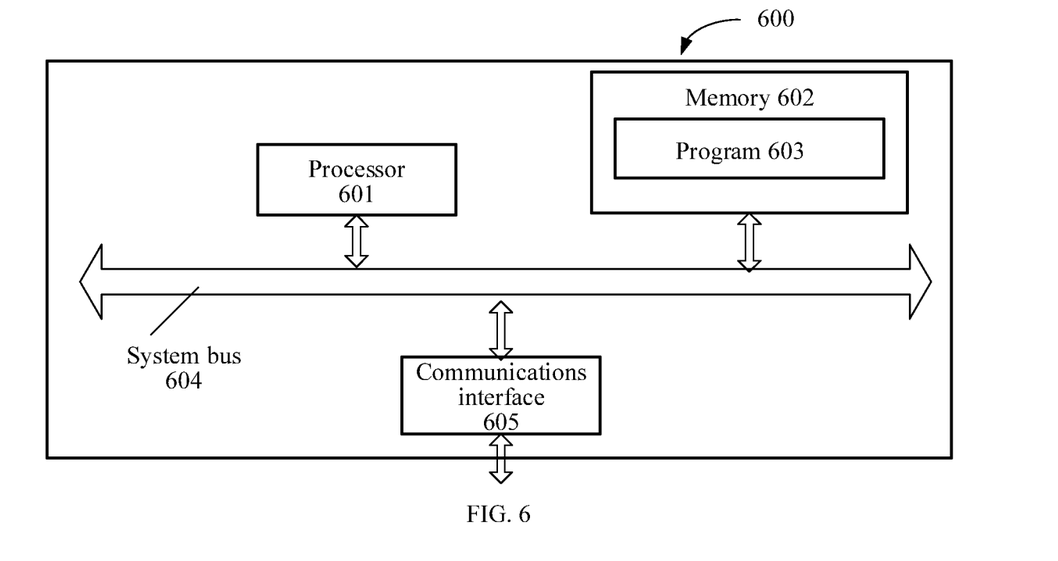
FIG. 6 is a schematic structural diagram of the composition of another baseboard management controller according to an embodiment.

FIG. 6 shows a baseboard management controller provided in an embodiment, where the baseboard management controller may include: a processor 601, a memory 602, a system bus 604, and a communications interface 605, where the processor 601, the memory 602, and the communications interface 605 are connected and accomplish mutual communication using the system bus 604.

The processor 601 may be a single-core or multi-core central processing unit, or may be a specific integrated circuit, or may be configured as one or more integrated circuits for implementing this embodiment.

The memory 602 may be a high-speed RAM memory, or may be a non-volatile memory, for example, at least one disk memory.

The memory 602 is configured to store a computer executable instruction 603. Specifically, the computer executable instruction 603 may include program code.

When the baseboard management controller runs, the processor 601 executes the computer executable instruction 603, to perform a method procedure of the fault processing method in Embodiment 3 or Embodiment 4.

A person of ordinary skill in the art may understand that, each aspect of the present disclosure or a possible implementation manner of each aspect may be specifically implemented as a system, a method, or a computer program product. Therefore, each aspect of the present disclosure or a possible implementation manner of each aspect may use forms of hardware only embodiments, software only embodiments (including firmware, resident software, and the like), or embodiments with a combination of software and hardware, which are uniformly referred to as "circuit", "module", or "system" herein. In addition, each aspect of the present disclosure or the possible implementation manner of each aspect may take a form of a computer program product, where the computer program product refers to computer-readable program code stored in a computer-readable medium.

The computer-readable medium may be a computer-readable signal medium or a computer-readable storage medium. The computer-readable storage medium includes but is not limited to an electronic, magnetic, optical, electromagnetic, infrared, or semi-conductive system, device, or apparatus, or any appropriate combination thereof, such as a random-access memory (RAM), a read-only memory (ROM), an erasable programmable ROM (EPROM or flash memory), an optical fiber, and a compact disc ROM (CD-ROM).

A processor in a computer reads computer-readable program code stored in a computer-readable medium, so that the processor can perform a function and an action specified in each step or a combination of steps in a flowchart; an apparatus is generated to implement a function and an action specified in each block or a combination of blocks in a block diagram.

All computer-readable program code may be executed on a user computer, or some may be executed on a user computer as a standalone software package, or some may be executed on a computer of a user while some is executed on a remote computer, or all the code may be executed on a remote computer or a computer. It should also be noted that, in some alternative implementation solutions, each step in the flowcharts or functions specified in each block in the block diagrams may not occur in the illustrated order. For example, two consecutive steps or two blocks in the illustration, which are dependent on an involved function, may in fact be executed substantially at the same time, or these blocks may sometimes be executed in reverse order.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

The foregoing descriptions are merely specific implementation manners of the present disclosure, but are not intended to limit the protection scope of the present disclosure. Any variation or replacement readily figured out by a person skilled in the art within the technical scope disclosed shall fall within the protection scope of the present disclosure. Therefore, the protection scope of the present disclosure shall be subject to the protection scope of the claims.

What is claimed is:

1. A system in a computer, comprising:
a processor; and
a baseboard management controller coupled to the processor and configured to:
   query the processor to obtain error data through a Platform Environment Control Interface (PECI) bus after detecting a fatal fault event indication associated with a CATERR_N signal;
   enable a warm reboot on the computer in response to failing to obtain the error data from a register of the processor; and
   obtain the error data from the processor,
wherein the processor is configured to:
   run a fault collection instruction of a basic input/output system (BIOS) of the computer during the warm reboot to collect the error data in response to an instruction of the baseboard management controller; or
   send the error data to the baseboard management, controller.

2. The system of claim 1, wherein the baseboard management controller is further configured to try to dump the register to obtain the error data before enabling the warm reboot.

3. The system of claim 1, wherein the baseboard management controller is further configured to detect the CATERR_N signal.

4. The system of claim 3, wherein the baseboard management controller is further configured to have direct access to the CATERR_N signal.

5. The system of claim 1, wherein the error data define which of a plurality of processors the error data comes from.

6. The system of claim 1, wherein the error data are internal error (IERR) data.

7. The system of claim 1, wherein the baseboard management controller is further configured to further enable the warm reboot after a preset waiting time.

8. The system of claim 1, wherein the fatal fault event indication indicates that a catastrophic error has occurred in the computer.

9. The system of claim 1, wherein the processor is further configured to trigger a system management interrupt (SMI) when acquiring other error data in the computer when the computer does not crash.

10. The system of claim 1, wherein the baseboard management controller is further configured to interface with the processor using an Intelligent Platform Management Interface (IPMI).

11. The system of claim 1, wherein, during the warm reboot, the computer is not powered off, the computer is not initialized, and information saved in the register is not lost.

12. A baseboard management controller in a computer, comprising:
a non-transitory memory configured to store instructions; and
a controller processor coupled to the non-transitory memory and configured to execute the instructions to:
   query a processor of the computer to obtain error data through a Platform Environment Control Interface (PECI) bus after detecting a fatal fault event indication associated with a CATERR_N signal;
   enable a warm reboot on the computer in response to failing to obtain the error data from a register of the processor;
   instruct the processor to run a fault collection instruction of a basic input/output system (BIOS) of the computer during the warm reboot to collect the error data; and
   obtain the error data from the processor.

13. The baseboard management controller of claim 12, wherein the controller processor is further configured to try to dump the register to obtain the error data before enabling the warm reboot.

14. The baseboard management controller of claim 12, wherein the controller processor is further configured to detect the CATERR_N signal.

15. The baseboard management controller of claim 14, wherein the controller processor is further configured to have direct access to the CATERR_N signal.

16. The baseboard management controller of claim 12, wherein the error data are internal error (IERR) data.

17. The baseboard management controller of claim 12, wherein, during the warm reboot, the computer is not powered off, the computer is not initialized, and information saved in the register is not lost.

18. A method comprising:
querying, by a baseboard management controller in a system in a computer, a processor in the system to obtain error data through a Platform Environment Control Interface (PECI) bus after detecting a fatal fault event indication associated with a CATERR_N signal;
enabling, by the baseboard management controller, a warm reboot on the computer in response to failing to obtain the error data from a register of the processor;
running, by the processor, a fault collection instruction of a basic input/output system (BIOS) of the computer during the warm reboot to collect the error data in response to an instruction of the baseboard management controller; and
sending, by the processor and to the baseboard management controller, the error data; and
obtaining, by the baseboard management controller and from the processor, the error data.

19. The method of claim 18, further comprising trying by the baseboard management controller, to dump the register to obtain the error data before enabling the warm reboot.

20. The method of claim 18, further comprising detecting by the baseboard management controller, the CATERR_N signal.

21. The method of claim 18, wherein, during the warm reboot, the computer is not powered off, the computer is not initialized, and information saved in the register is not lost.

* * * * *

UNITED STATES PATENT AND TRADEMARK OFFICE
CERTIFICATE OF CORRECTION

PATENT NO. : 11,360,842 B2
APPLICATION NO. : 17/187111
DATED : June 14, 2022
INVENTOR(S) : Gang Song It is certified that error appears in the above-identified patent and that said Letters Patent is hereby corrected as shown below:

In the Claims

Claim 1, Column 21, Line 19: "or" should read "and"

Signed and Sealed this
Twenty-fifth Day of October, 2022

Katherine Kelly Vidal
*Director of the United States Patent and Trademark Office*